(12) United States Patent
San et al.

(10) Patent No.: US 12,097,549 B2
(45) Date of Patent: Sep. 24, 2024

(54) STAMP-FORMING SYSTEM AND METHOD

(71) Applicant: The Boeing Company, Chicago, IL (US)

(72) Inventors: Kenndy San, Wentzville, MO (US); Emma L. Morrissey, Saint Louis, MO (US); Gregory J. Hickman, University City, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/932,641

(22) Filed: Sep. 15, 2022

(65) Prior Publication Data

US 2024/0091839 A1      Mar. 21, 2024

(51) Int. Cl.
  *B29C 51/30* (2006.01)
  *B21D 22/10* (2006.01)
  *B29C 33/40* (2006.01)

(52) U.S. Cl.
  CPC ............ *B21D 22/10* (2013.01); *B29C 33/405* (2013.01); *B29C 51/30* (2013.01)

(58) Field of Classification Search
  CPC .............................. B29C 33/405; B29C 51/30
  See application file for complete search history.

(56) References Cited

U.S. PATENT DOCUMENTS

| | | | | |
|---|---|---|---|---|
| 3,059,603 A | | 10/1962 | Bell | |
| 3,748,889 A | * | 7/1973 | Miller | B21D 13/02 72/466.8 |
| 5,081,859 A | * | 1/1992 | De Smet | B21D 22/10 72/57 |
| 5,255,550 A | * | 10/1993 | Dittlo | B21D 22/10 72/63 |

FOREIGN PATENT DOCUMENTS

GB          553158          8/1942

OTHER PUBLICATIONS

Brooks et al., "A review on stamp forming of continuous fibre-reinforced thermoplastics," International Journal of Lightweight Materials and Manufacture, vol. 5, Issue 3, Sep. 2022, pp. 411-430.

* cited by examiner

*Primary Examiner* — Alison L Hindenlang
*Assistant Examiner* — Debjani Roy

(57) ABSTRACT

A stamp-forming system includes a lower die formed of elastomeric material and having lower die lateral sides. In addition, the stamp-forming system includes a die wall configured to encircle the lower die lateral sides, and move vertically relative to the lower die. Also included in the stamp-forming system is an upper die configured to move between an open position in which the upper die is separated from the die wall and the lower die, and a clamped position in which the upper die is in contact with the die wall and applying clamping pressure to a blank against the lower die, to thereby form the blank into a formed article. The die wall is sized and configured to prevent lateral expansion of the lower die when the lower die is vertically compressed by the clamping pressure applied by the upper die.

20 Claims, 20 Drawing Sheets

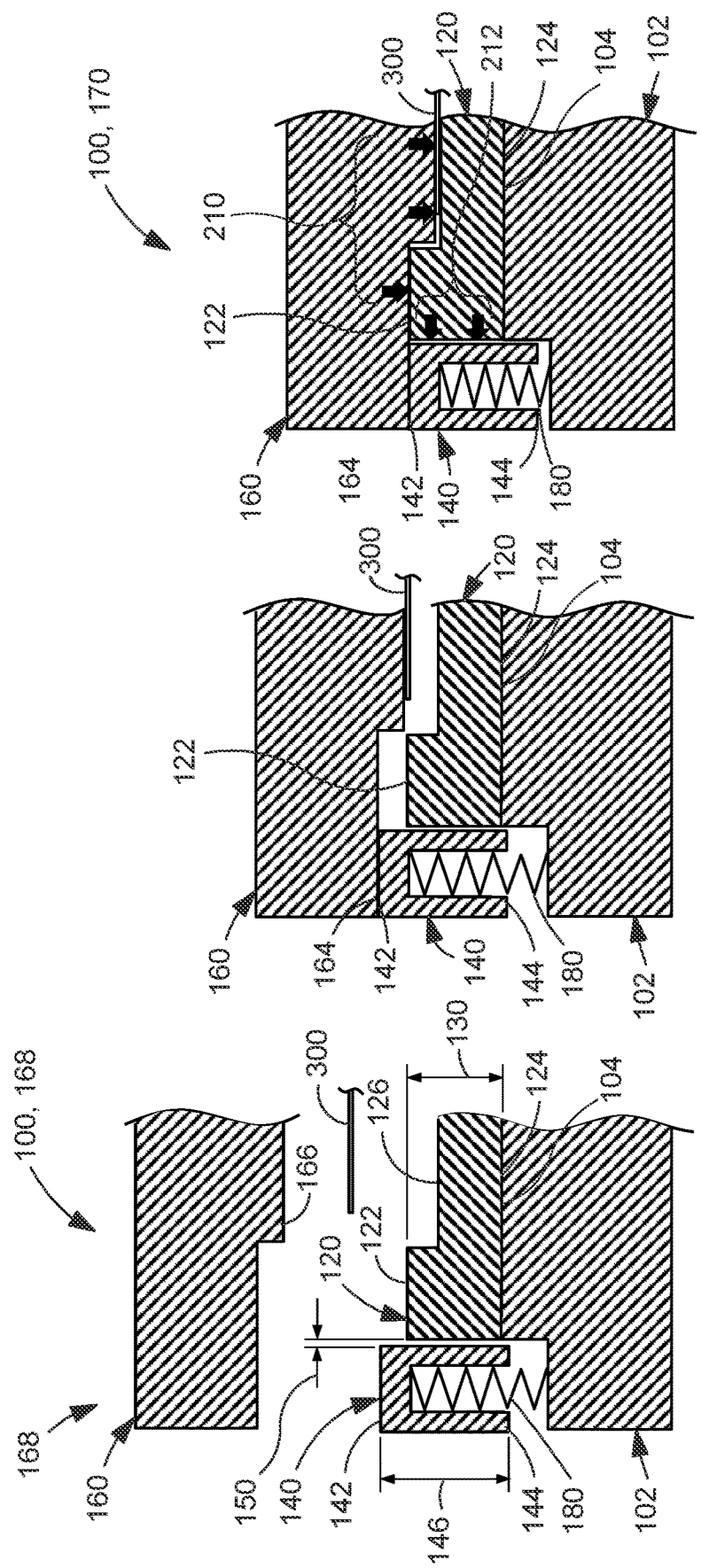

STAMP-FORMING SYSTEM AND METHOD

FIELD

The present disclosure relates generally to stamp forming and, more particularly, to a system and method for stamp forming a blank, such as a thermoplastic laminate.

BACKGROUND

Composite materials are used in a wide variety of applications due to their high specific strength, high specific stiffness, and high corrosion resistance. Composite materials are comprised of fibrous material (e.g., carbon fibers) impregnated with a resin (e.g., prepreg). The resin is either a thermoplastic resin or a thermosetting resin. Thermoplastic composite parts may have reduced manufacturing costs relative to thermosetting composite parts. As a result, thermoplastic materials are increasingly used in aircraft production, such as for manufacturing components in the wings, the fuselage, and the tail section of an aircraft.

Known systems for manufacturing thermoplastic parts involve the use of matched metal dies for forming a thermoplastic blank into a desired shape. The thermoplastic blank is generated by laying up a plurality of thermoplastic plies. The thermoplastic blank is then positioned between a metal top die and a metal bottom die, and clamping pressure is applied to form the thermoplastic blank. Although matched metal dies are generally effective for their intended purpose, machining tolerances in the top die and bottom die can result in the non-uniform distribution of pressure across the thermoplastic blank during the forming process.

Another system for forming thermoplastic parts includes the use of a metal top die and a conforming bottom die. The conforming bottom die is supported on a die box. The conforming bottom die accommodates machining tolerances in the metal top die, and thereby provides for a more uniform distribution of pressure across the thermoplastic blank during the forming process. However, the clamping pressure applied by the metal top die causes the edges of the conforming bottom die to squeeze through gaps between the metal top die and the die box which, over time, can result in damage to the conforming bottom die.

As can be seen, there exists a need in the art for a system and method for forming thermoplastic parts that avoid the above-noted challenges.

SUMMARY

The above-noted needs associated with forming thermoplastic blanks are addressed by the present disclosure, which provides a stamp-forming system for forming a blank into a formed article. The stamp-forming system includes a lower die formed of elastomeric material and having lower die lateral sides. In addition, the stamp-forming system includes a die wall configured to encircle the lower die lateral sides, and move vertically relative to the lower die. Also included in the stamp-forming system is an upper die configured to move between an open position in which the upper die is separated from the die wall and the lower die, and a clamped position in which the upper die is in contact with the die wall and applying clamping pressure to a blank against the lower die, to thereby form the blank into a formed article. The die wall is sized and configured to prevent lateral expansion of the lower die when the lower die is vertically compressed by the clamping pressure applied by the upper die.

Also disclosed is an example of a stamp-forming system having an upper die formed of rigid material and having an upper die bottom side having an upper die contour. The stamp-forming system also includes a lower die formed of elastomeric material and having lower die lateral sides and a lower die top side having a lower die contour that matches the upper die contour. Additionally, the stamp-forming system includes a die wall configured to encircle the lower die lateral sides, and move vertically relative to the lower die. The upper die is configured to move between an open position in which the upper die is separated from the die wall and the lower die, and a clamped position in which the upper die is in contact with the die wall and applying clamping pressure to a blank against the lower die, to thereby form the blank into a formed article. The die wall is sized and configured to prevent lateral expansion of the elastomeric material of the lower die when the lower die is vertically compressed by the clamping pressure of the upper die.

Additionally disclosed is a method of stamp forming a blank, comprising positioning a blank between a lower die and an upper die in an open position. The lower die is formed of elastomeric material, and has lower die lateral sides that are encircled by a die wall that is vertically movable. The method also includes moving the upper die from the open position to a clamped position in which the upper die is in contact with the die wall, and is applying clamping pressure to the blank against the lower die. The method further includes preventing, using the die wall, lateral expansion of the lower die when the lower die is vertically compressed by the clamping pressure.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 8 is a partial sectional view of the stamp-forming system illustrating the upper die in the open position, and further illustrating the die wall supported by the resiliently compressible device;

FIG. 9 is a sectional view of the stamp-forming system of FIG. 8, illustrating the upper die moved downwardly into contact with the die wall;

FIG. 10 is a sectional view of the stamp-forming system of FIG. 8, illustrating the upper die in the clamped position, and further illustrating the die wall preventing lateral expansion of the lower die when vertically compressed by the clamping pressure applied by the upper die;

DETAILED DESCRIPTION

Disclosed examples will now be described more fully hereinafter with reference to the accompanying drawings, in which some, but not all of the disclosed examples are shown. Indeed, several different examples or versions may be provided, and should not be construed as limited to the examples or versions set forth herein. Rather, these examples or versions are provided so that this disclosure will be thorough and fully convey the scope of the disclosure to those skilled in the art.

This specification includes references to "some examples," "one example," or "an example." Instances of the phrases "some examples," "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks. As such, the parts or components can be said to be configured to perform the task even when the specified part or component is not currently operational.

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 23:
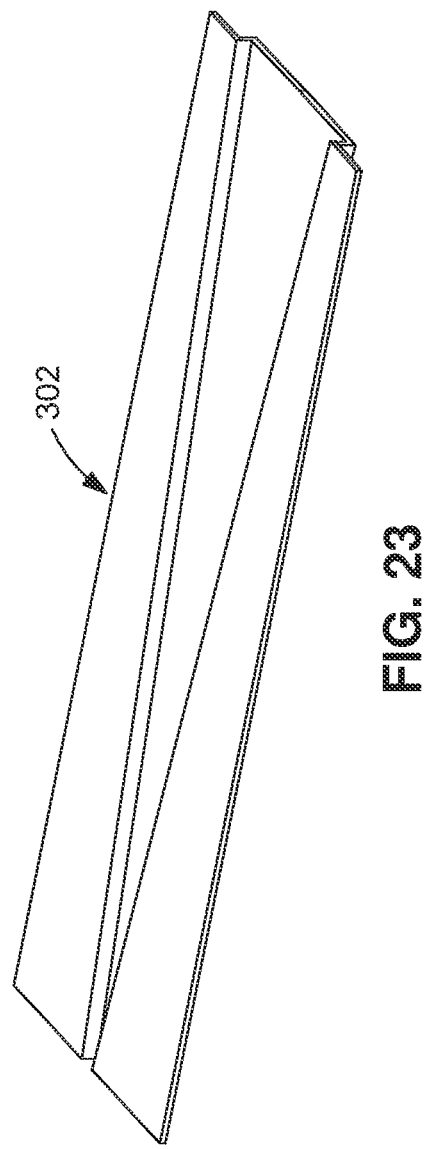
FIG. 23 shows the formed part resulting from forming the thermoplastic blank using the stamp-forming system of FIG. 11; and The figures shown in this disclosure represent various aspects of the versions presented, and only differences will be discussed in detail.

Referring now to the drawings, shown in FIGS. 1-10 is an example of a stamp-forming system 100 for forming a blank 300 into a formed article 302 (FIG. 23). The stamp-forming system 100 includes an upper die 160, a lower die 120, a die wall 140, and a base member 102. In addition, the stamp-forming system 100 includes one or more resiliently compressible devices 180 for supporting the die wall 140, and one or more alignment devices 186 for maintaining the position of the die wall 140 relative to the lower die 120. The upper die 160, the base member 102, and the die wall 140 are formed of a rigid material, preferably one that remains rigid at the temperatures that the stamp-forming system 100 is subjected to during stamp forming of the blank 300. The rigid material can be metallic, composite, ceramic, or any other suitable rigid material. In one example, the upper die 160, the base member 102, and the die wall 140 are formed of tool steel.

Figure 1:
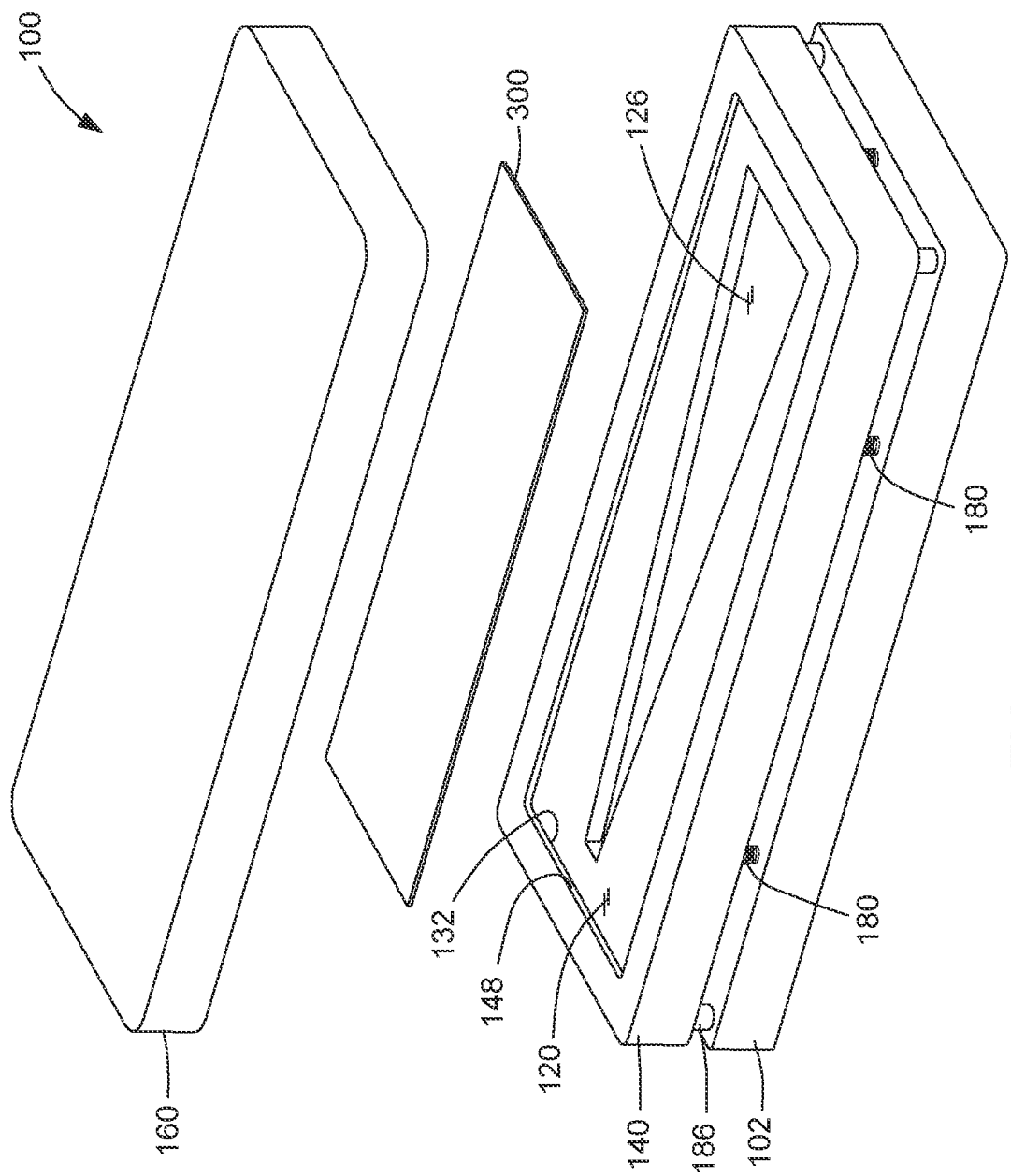
FIG. 1 is a perspective view of an example of a stamp-forming system for forming a blank, shown positioned between an upper die and an elastomeric lower die, which is surrounded by a die wall and supported on a base member.

FIG. 1 shows the blank 300 positioned between the upper die 160 and the elastomeric lower die 120, which is surrounded by the die wall 140 and supported on the base member 102. In the present disclosure, the blank 300 is described as a generally planar thermoplastic laminate comprised of a plurality of plies (not shown) that are laminated together. Each ply is comprised of reinforcing fibers that are pre-impregnated with thermoplastic resin. The fibers are typically unidirectional, but can be woven, braided, chopped in random orientations, or other fiber configurations. Although the stamp-forming system 100 is described in the context of forming a thermoplastic laminate, the stamp-forming system 100 may be implemented for forming a blank 300 having any one of a variety of different material compositions.

Figure 2:
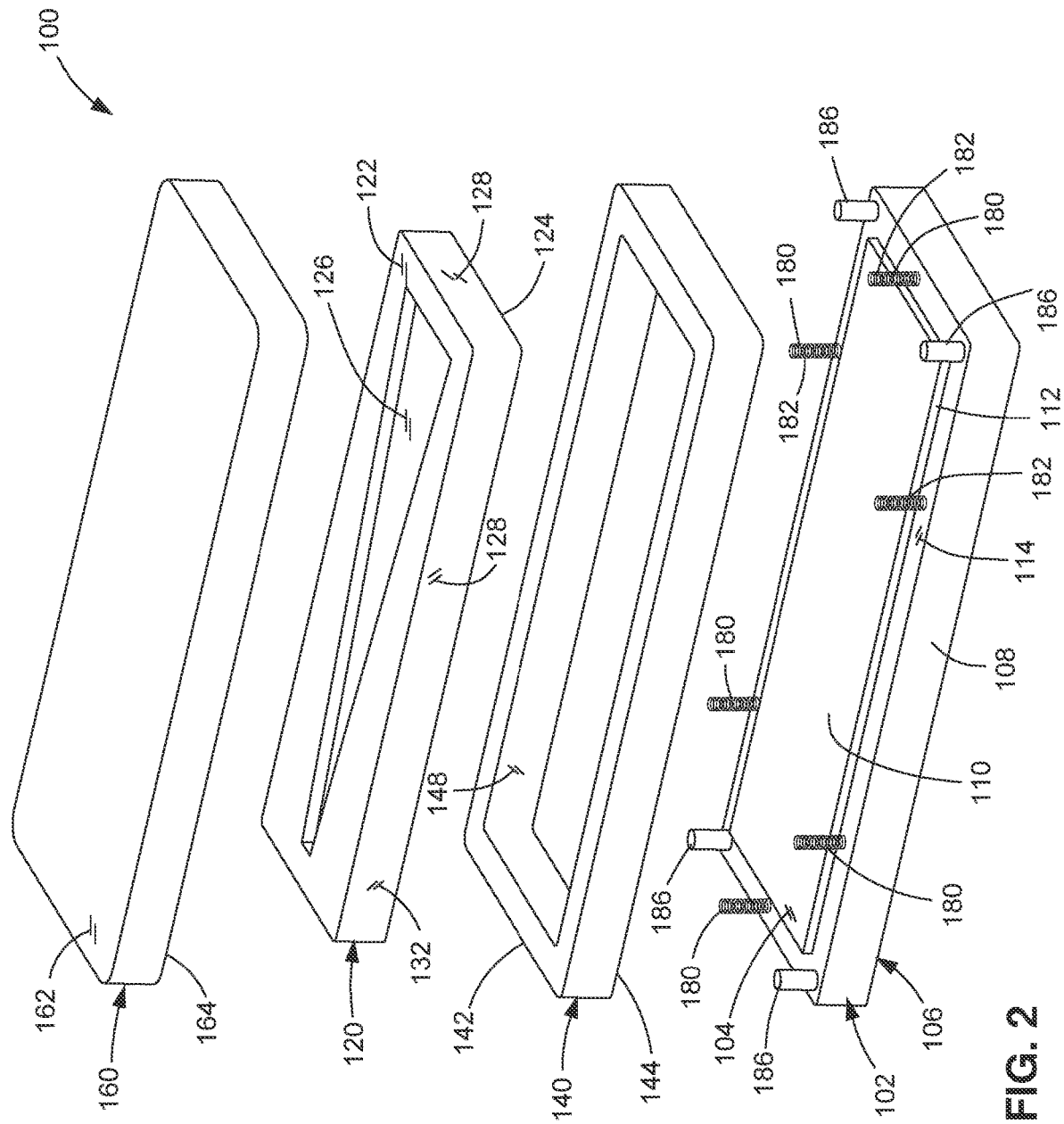
FIG. 2 is an exploded view of the stamp-forming system of FIG. 1, showing a lower die contour of the lower die.
Figure 3:
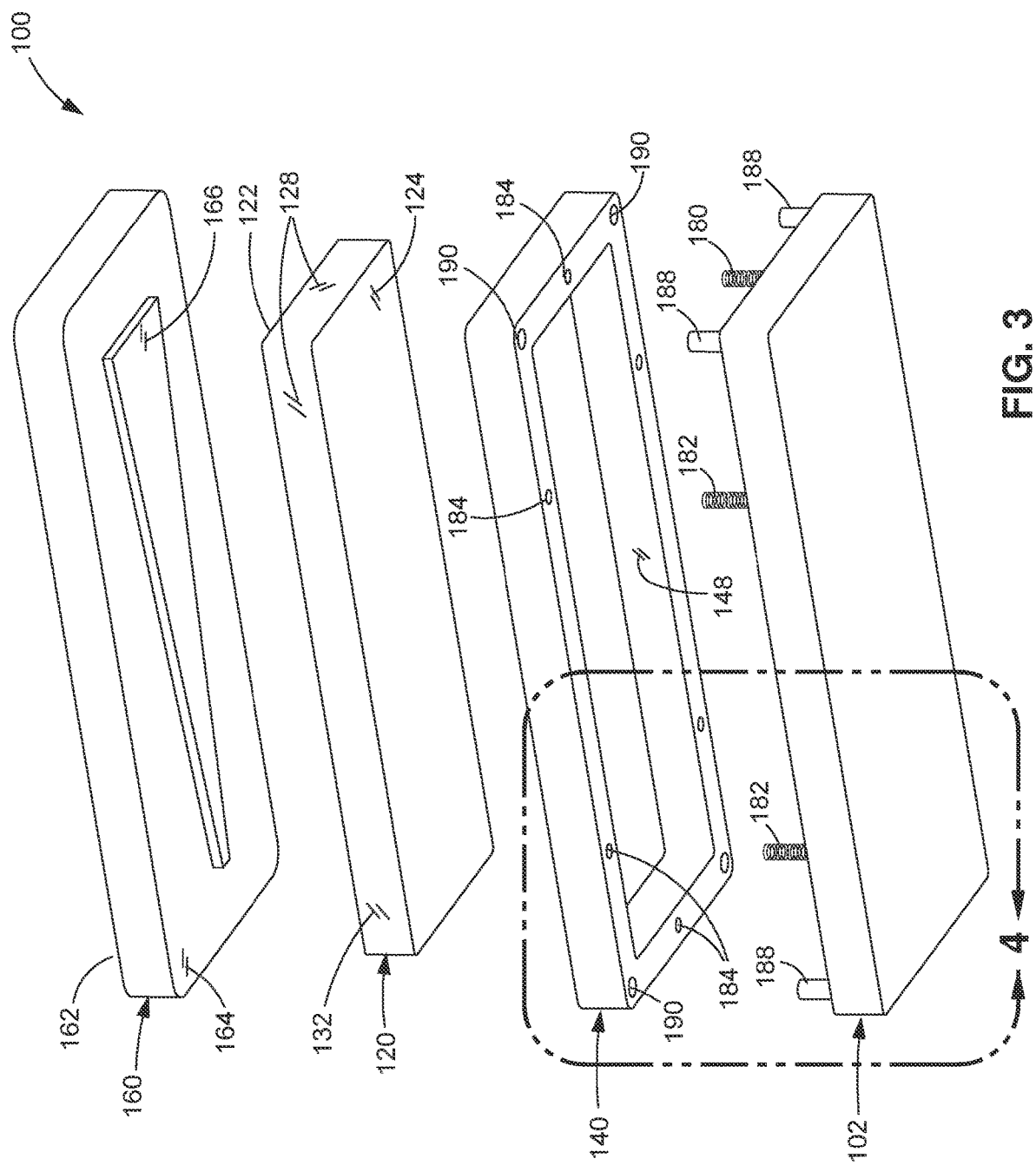
FIG. 3 is a further exploded view of the stamp-forming system of FIG. 1, showing an upper die contour of the upper die.

Referring still to FIGS. 1-10, the base member 102 has a base member top side 104, a base member bottom side 106, and base member lateral sides 108. In the example shown, the base member 102 has an upwardly protruding platform 110. The platform 110 is configured to support the lower die 120. As described below, the platform 110 has a platform outer perimeter 112 that is no larger than the lower die outer perimeter 132, thereby allowing the die wall 140 to freely move (e.g., downwardly) as the upper die 160 applies clamping pressure 210 (FIG. 10) onto the blank 300 against the lower die 120. As shown in FIG. 2, the platform 110 is surrounded by a ledge 114, which extends continuously around the platform 110. The platform 110 is located above the ledge 114 at a height that allows for unhindered movement of the die wall 140 during the forming process. The ledge 114 faces the die wall bottom side 144, as shown in FIGS. 2-3, and provides a means for mounting the resiliently compressible devices 180 and the alignment devices 186, as described in greater detail below.

As mentioned above, the lower die 120 is supported on the platform 110. The platform 110 defines the base member top side 104. In some examples, the lower die 120 may be unsecured to the platform 110. In other examples, the lower die 120 may be secured to the platform 110 by suitable means, such as using one or more mechanical features (not shown) that engage with the platform 110, and thereby prevent lateral movement of the lower die 120 relative to the platform 110. Alternatively or additionally, the lower die 120 may be adhesively bonded to the platform 110.

The lower die 120 is made of elastomeric material. The elastomeric material allows for the uniform distribution of clamping pressure 210 (FIG. 10) applied by the upper die 160 on the blank 300 against the lower die 120, and thereby improves the consolidation and forming of the blank 300 during the forming process. The elastomeric material can be natural rubber, synthetic rubber, RTV rubber, silicone, or any other type of elastomeric material or combinations thereof. The elastomeric material is preferably mechanically stable at temperatures required for forming the thermoplastic laminate. In this regard, the elastomeric material is mechanically stable at the glass transition temperature of the thermoplastic resin of the thermoplastic laminate.

The lower die 120 has lower die lateral sides 128, which define a lower die outer perimeter 132. In addition, the lower die 120 has a lower die bottom side 124 and a lower die top side 122. As mentioned above, the lower die outer perimeter 132 is no larger than the platform outer perimeter 112, to thereby allow unhindered vertical movement of the die wall 140 during the forming process. The lower die 120 has a lower die height 130 (FIG. 8) that extends between the lower die bottom side 124 and the lower die top side 122.

Referring to FIGS. 1-2, the lower die top side 122 has a lower die contour 126. As shown in FIG. 3, the lower die contour 126 matches the upper die contour 166 of the upper die 160. However, in other examples not shown, the lower die contour 126 can be flat or planar, or the lower die contour 126 can have any one of a variety of other contours that are complementary to the upper die contour 166. In some examples, the lower die 120 has a thickness of at least 0.5 inch measured in a direction locally normal to the lower die contour 126. The lower die 120 thickness can be up to 5.0 inches or more.

Referring to FIGS. 1-4, the die wall 140 has a die wall top side 142, a die wall bottom side 144, and a die wall inner perimeter 148. The die wall 140 perimeter is configured to encircle the lower die lateral sides 128. The die wall 140 has a die wall height 146 (FIG. 8) that extends between the die wall bottom side 144 and the die wall top side 142. The die wall height 146 is at least as tall as the lower die height 130, such that when the upper die 160 starts to apply clamping pressure 210 (FIG. 10) to the blank 300 against the lower die 120, the die wall 140 fully envelopes the lower die 120, and thereby prevents expansion of the lower die 120 in the lateral direction 212 (FIG. 10).

As mentioned above, the die wall 140 is configured to move vertically relative to the lower die 120 when the upper die 160 is in the open position 168 (FIG. 8), and when moving toward the clamped position 170. In this regard, when viewed from a top-down direction, the die wall inner perimeter 148 has a constant cross-sectional shape that is open on the die wall top side 142, and open on the die wall bottom side 144. The die wall inner perimeter 148 is sized complementary to the lower die outer perimeter 132. In this regard, the lateral dimensions (e.g., length and width) of the die wall inner perimeter 148 are slightly larger than the lateral dimensions of the lower die outer perimeter 132, to thereby allow the die wall 140 to freely move vertically relative to the lower die 120 as the upper die 160 is moved into contact with the die wall 140. The lower die 120 and the die wall 140 are sized and configured such that, prior to the upper die 160 applying clamping pressure 210 (FIG. 10) to the blank 300 against the lower die 120, there may be a wall/die gap 150 (FIG. 8) of up to 0.10 inch at any point between the lower die outer perimeter 132 and the die wall inner perimeter 148 at. However, the maximum wall/die gap 150 may be smaller than 0.10 inch. The maximum wall/die gap 150 may be measured when the stamp-forming system 100 is at its maximum temperature (e.g., the glass transition temperature of the thermoplastic laminate) during the forming process.

Figure 18:
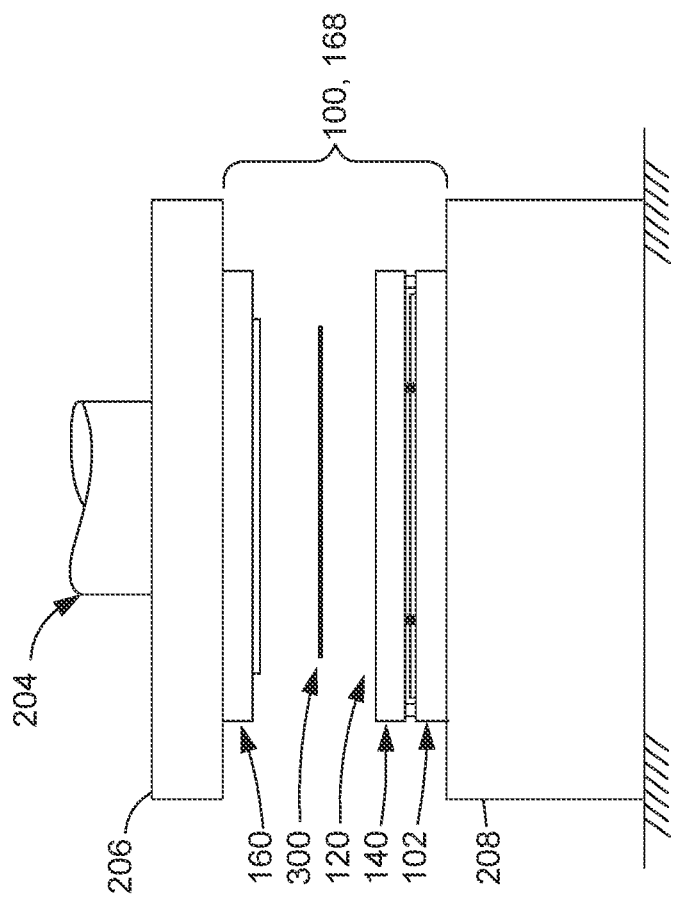
FIG. 18 is a front view of an example of a forming press containing the presently-disclosed stamp-forming system.
Figure 17:
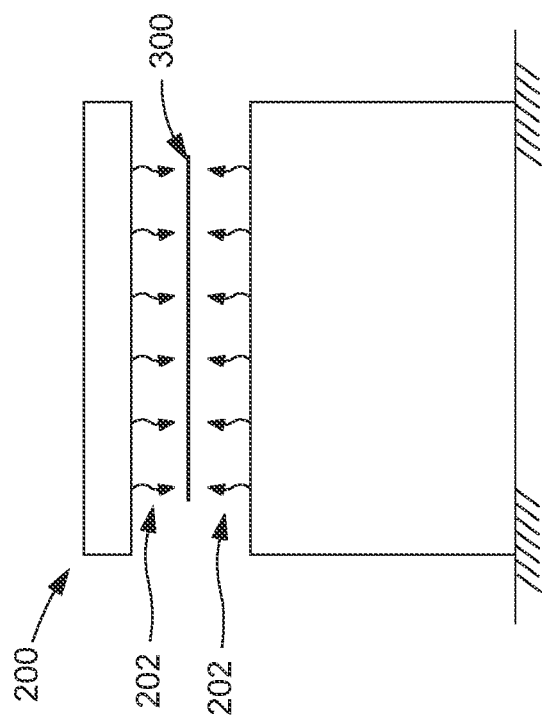
FIG. 17 is a front view of an example of an oven for heating a blank prior to forming using the stamp-forming system.

The upper die 160 has an upper die top side 162, and an upper die bottom side 164. The upper die bottom side 164 has an upper die contour 166. The upper die contour 166 contains the desired shape of the formed article 302 (FIG. 23). In the example shown, the upper die contour 166 is complementary to the lower die contour 126. As mentioned above, the upper die 160 is configured to move between the open position 168 (e.g., FIGS. 5 and 8) in which the upper die 160 is separated from the die wall 140 and the lower die 120, and a clamped position 170 (e.g., FIGS. 6 and 10) in which the upper die 160 is in contact with the die wall 140, and is applying clamping pressure 210 to the blank 300 against the lower die 120, to thereby form the blank 300 into a formed article 302. As described in greater detail below, the stamp-forming system 100 can be mounted in a forming press 204 (FIG. 18). The upper die 160 can be coupled to a movable upper press 206 of the forming press 204, and the base member 102 can be mounted on a press bed 208 of the forming press 204. The vertically downward movement of the upper press 206 causes the upper die 160 to apply clamping pressure 210 (FIG. 10) to the blank 300 against the lower die 120.

The die wall 140 is sized and configured to prevent lateral expansion of the elastomeric material of the lower die 120 (i.e., due to Poisson's effect) when vertically compressed by the clamping pressure 210 (FIG. 10) from the upper die 160. In this regard, the lateral dimensions (e.g., length and width) of the upper die 160 are such that when the upper die 160 is in the clamped position 170 (FIG. 10), the radially outer portion of the upper die bottom side 164 is in contact with at least the radially inner portion of the die wall top side 142. As a result, when the upper die 160 is starting to apply clamping pressure 210 (FIG. 10) while moving toward the clamped position 170, the lower die 120 is completely enclosed by the upper die 160, the die wall 140, and the base member 102 (i.e., the platform 110), thereby preventing the lower die 120 from protruding or squeezing through any gaps between the upper die 160 and the die wall 140, and any gaps between the die wall 140 and the base member 102. By preventing expansion in the lateral direction 212, the lower die 120 is protected from damage due to overstressing.

Referring to FIGS. 2-4 and 7-10, the stamp-forming system 100 includes one or more resiliently compressible devices 180 for supporting the die wall 140, and one or more alignment devices 186 for maintaining alignment of the die wall 140 relative to the lower die 120. The resiliently compressible devices 180 are located between the die wall 140 and the base member 102. In addition, the resiliently compressible devices 180 and the alignment devices 186 are mounted to or protrude from the die wall 140 and/or the ledge 114. In the example shown, the resiliently compressible devices 180 are coil springs 182, and the alignment devices 186 are alignment pins 188.

As shown in FIGS. 8-10, the resiliently compressible devices 180 are configured to support the die wall 140 in a manner such that the die wall top side 142 is located above the lower die top side 122 when the upper die 160 is in the open position 168, as shown in FIG. 8. In addition, the resiliently compressible devices 180 are configured to maintain the die wall 140 against the upper die 160 when the upper die 160 is moving toward the clamped position 170, as shown in FIG. 9. Furthermore, when the upper die 160 starts to apply clamping pressure 210 (FIG. 10) on the lower die 120 as the upper die 160 moves into the clamped position 170 (FIG. 9-10), the resiliently compressible devices 180 are configured to compress at least by an amount allowing for positioning of the die wall 140 at a height such that the die wall top side 142 is no lower than the lower die top side 122, and the die wall bottom side 144 is no higher than the lower die bottom side 124, as shown in FIG. 10. In the example of FIGS. 8-10, the stamp-forming system 100 is configured such that the die wall bottom side 144 is lower than the lower die bottom side 124 prior to and during the application of clamping pressure 210 by the upper die 160 on the lower die 120, thereby preventing the elastomeric lower die 120 from squeezing out between gaps (not shown) between the die wall bottom side 144 and the base member top side 104, as would otherwise occur if the die wall bottom side 144 was higher than the lower die bottom side 124 during the initial application of clamping pressure 210 on the lower die 160.

Figure 4:
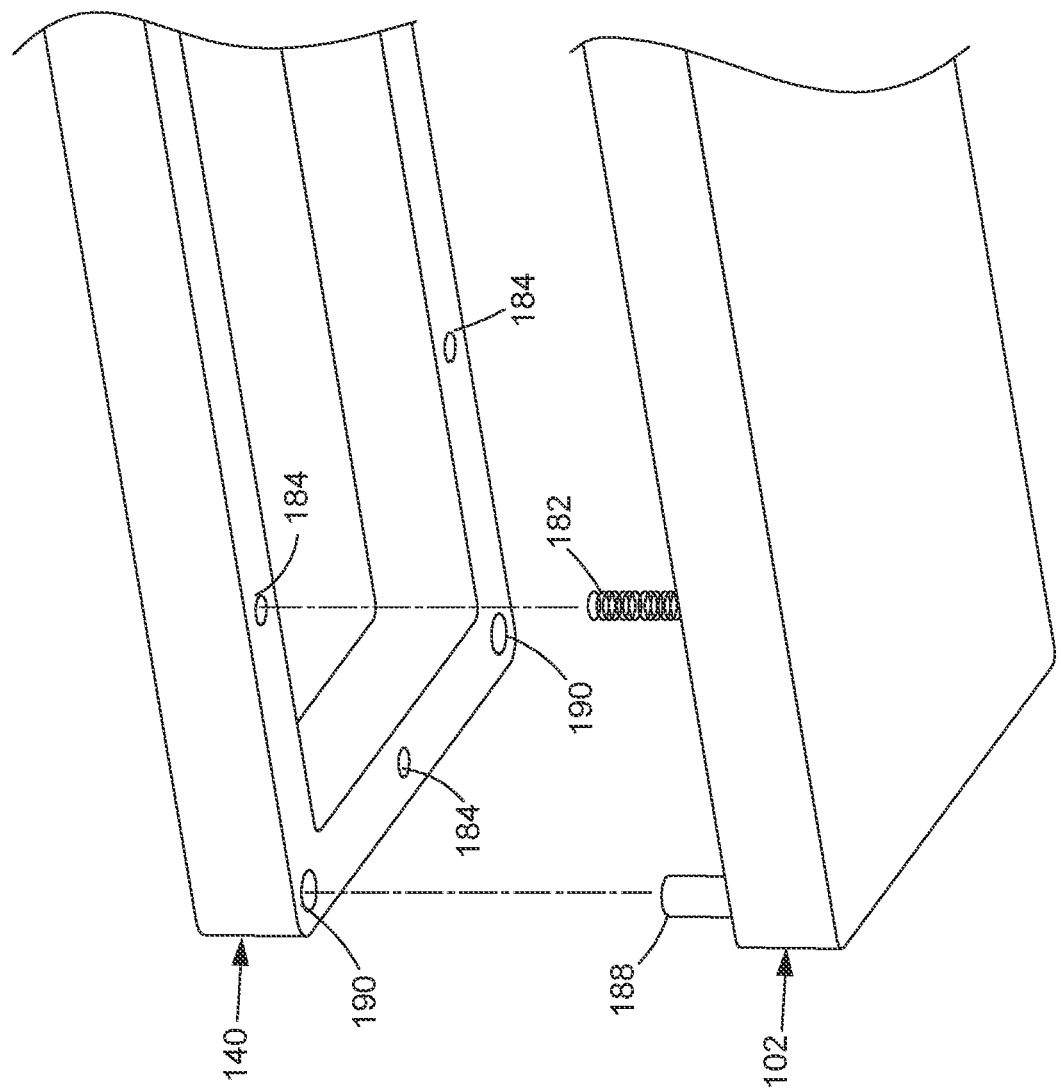
FIG. 4 is a magnified view of the portion of the stamp-forming system identified by reference numeral 3 of FIG. 1, and illustrating an example of an alignment device (i.e., an alignment pin) and a resiliently compressible device (i.e., a coils spring) mounted to the base member and engageable with the die wall.
Figure 5:
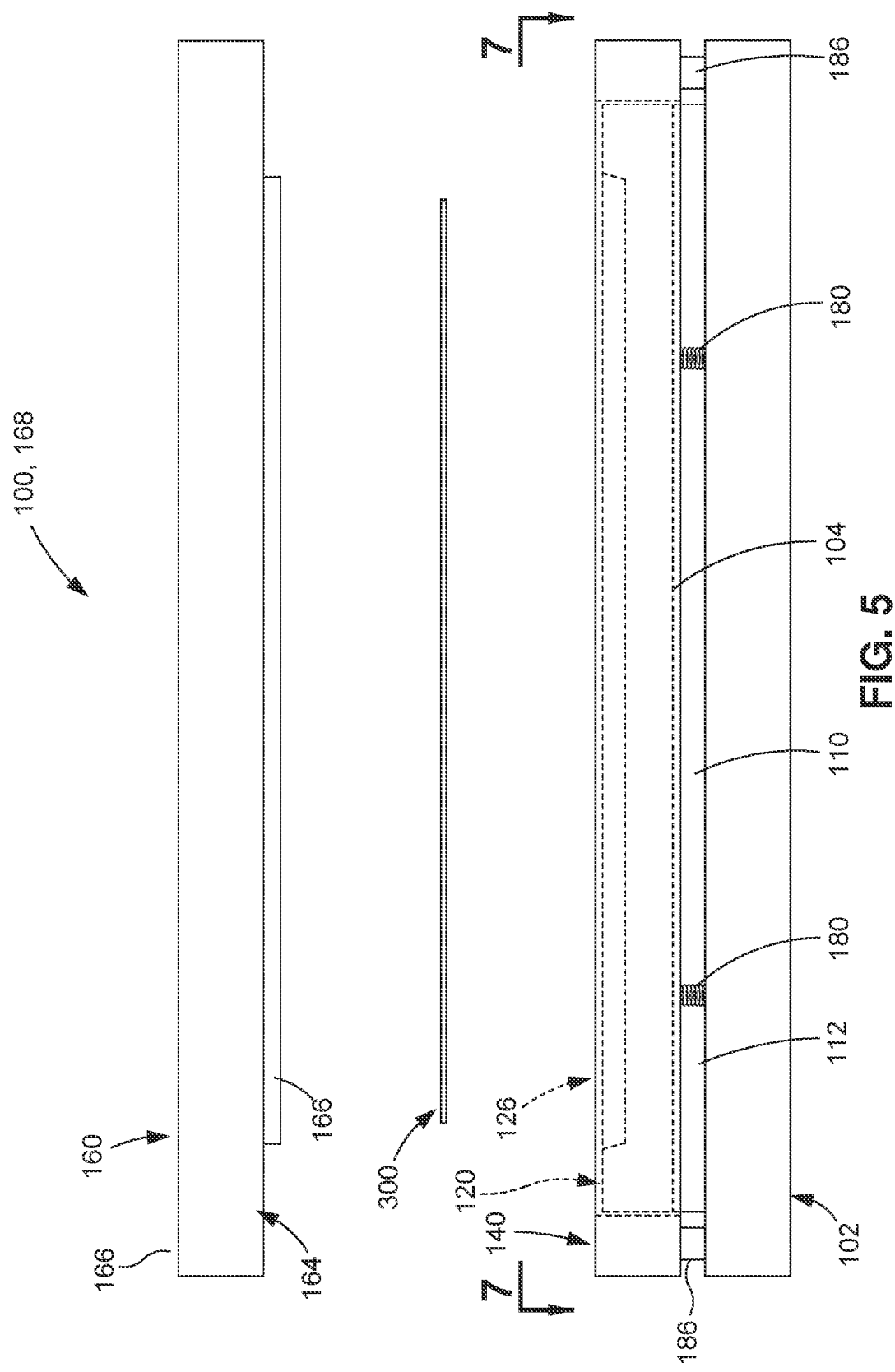
FIG. 5 is a front view of the stamp-forming system of FIG. 1, showing the upper die in an open position.
Figure 6:
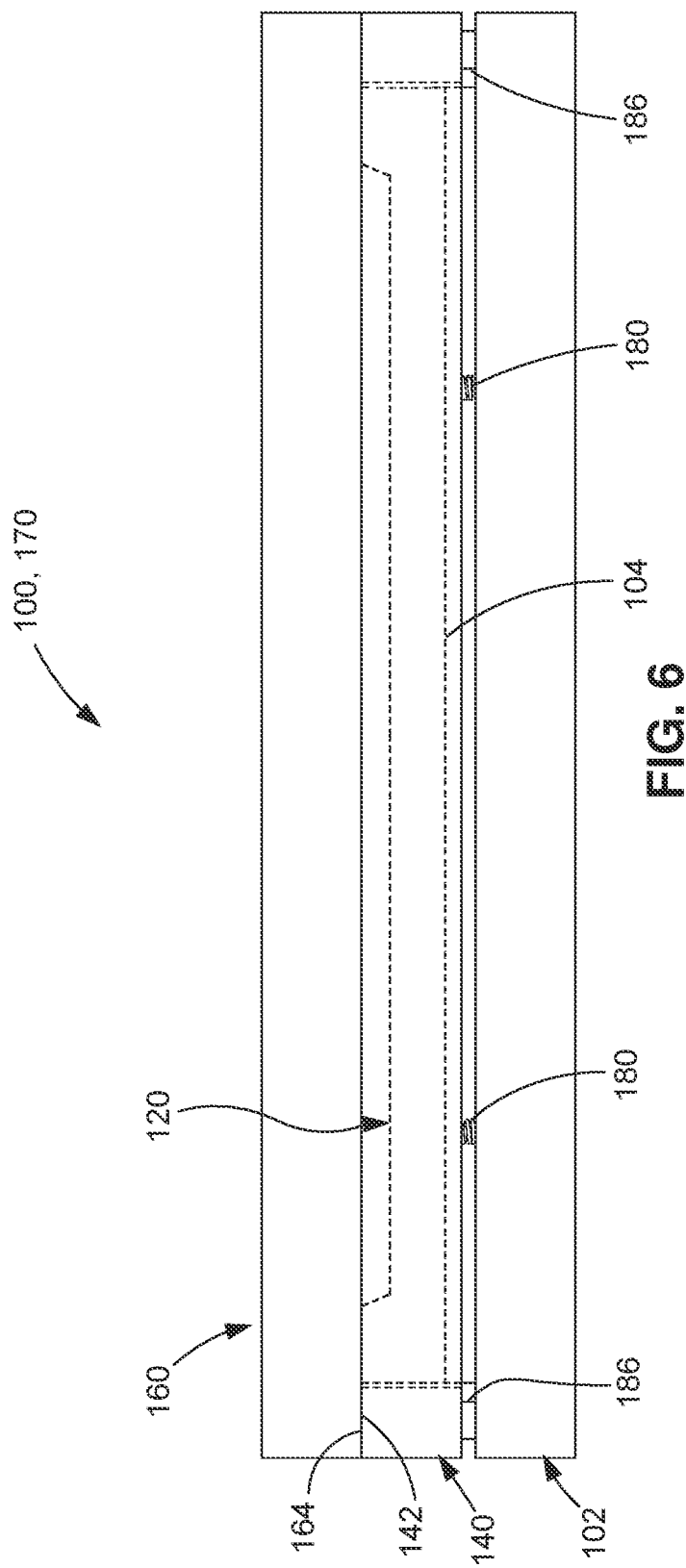
FIG. 6 is a front view of the stamp-forming system of FIG. 1, showing the upper die in a clamped position for forming the thermoplastic blank into the shape of the upper die contour and the lower die contour.
Figure 7:
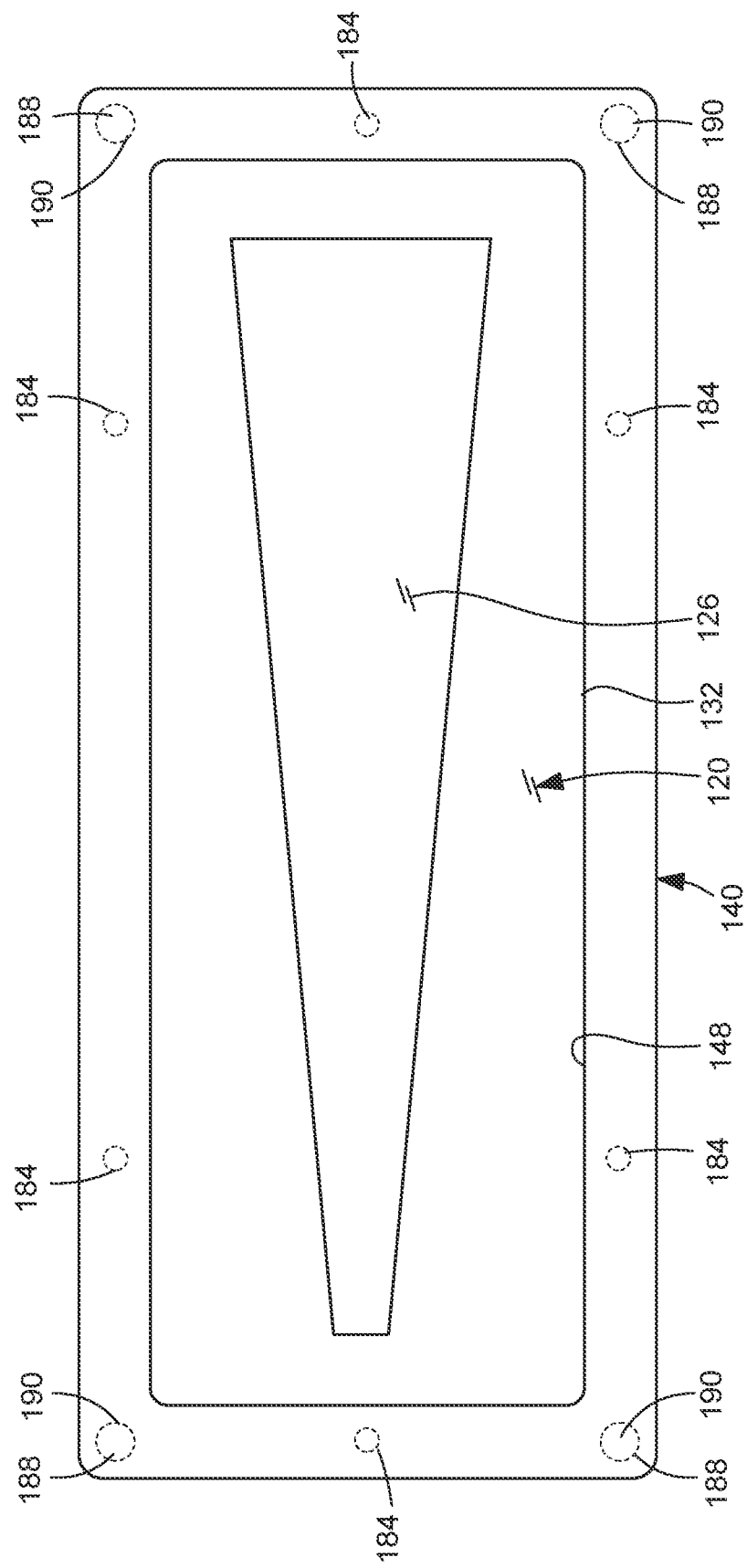
FIG. 7 is a top-down view of the stamp-forming system, taken along line 7-7 of FIG. 5.
Figure 11:
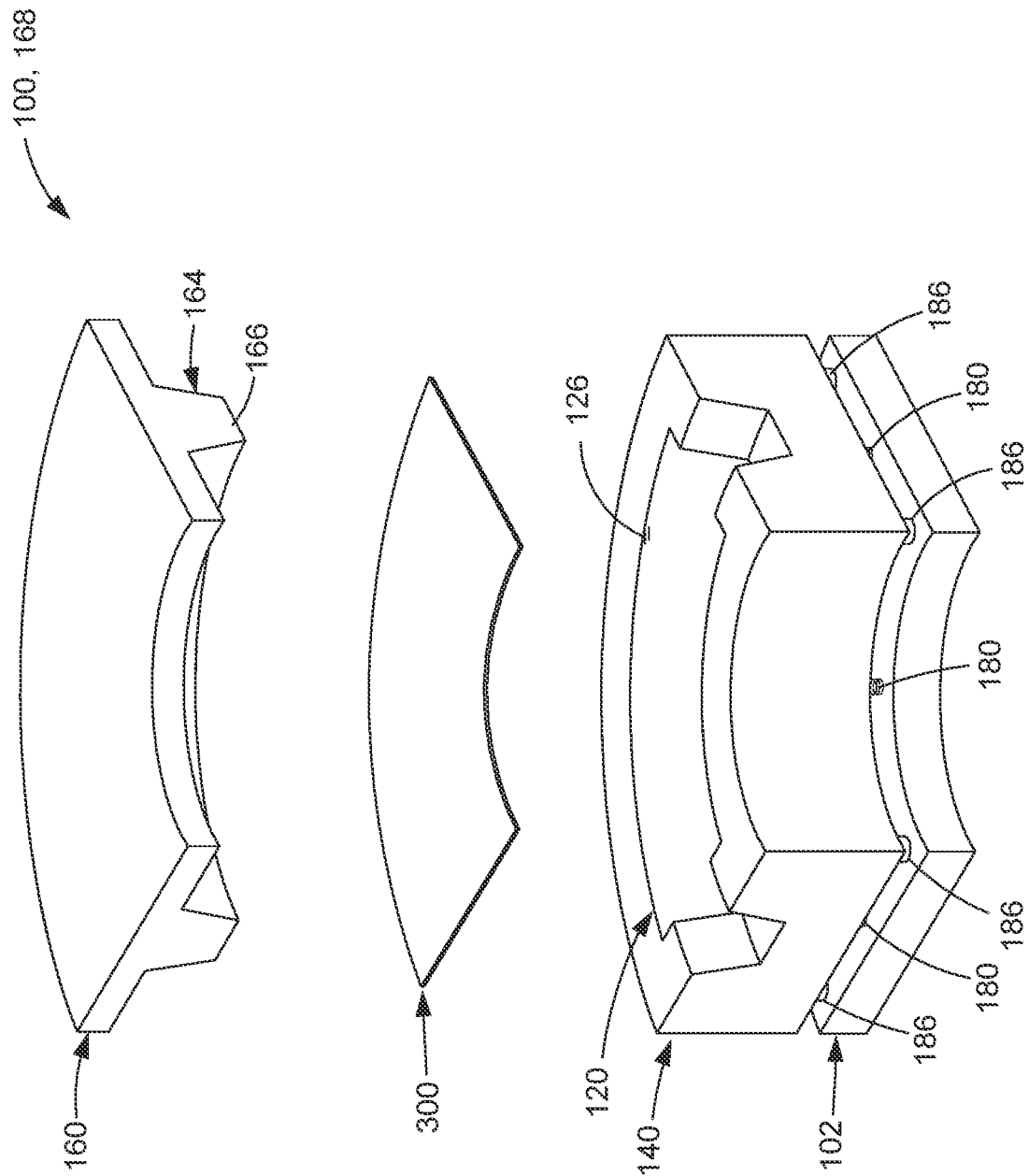
FIG. 11 is a perspective view of a further example of a stamp-forming system the open position, and in which the upper die and the lower die respectively include an upper die contour and a lower die contour that extending between the opposing ends of the stamp-forming system, and further illustrating the die wall having a shape that is complementary to the upper die contour and the lower die contour.
Figure 12:
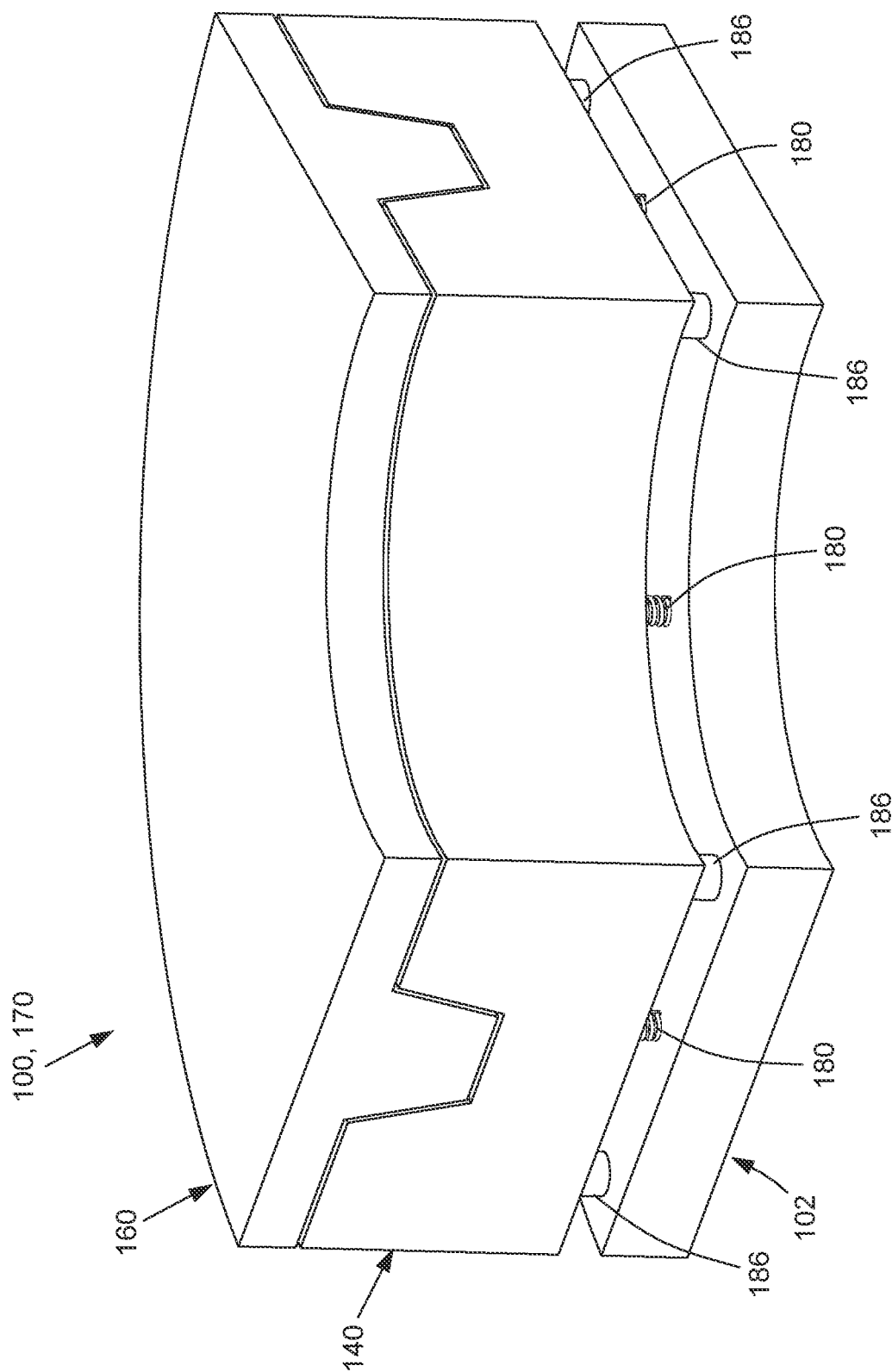
FIG. 12 is a perspective view of the stamp-forming system of FIG. 11 in the closed position.
Figure 13:
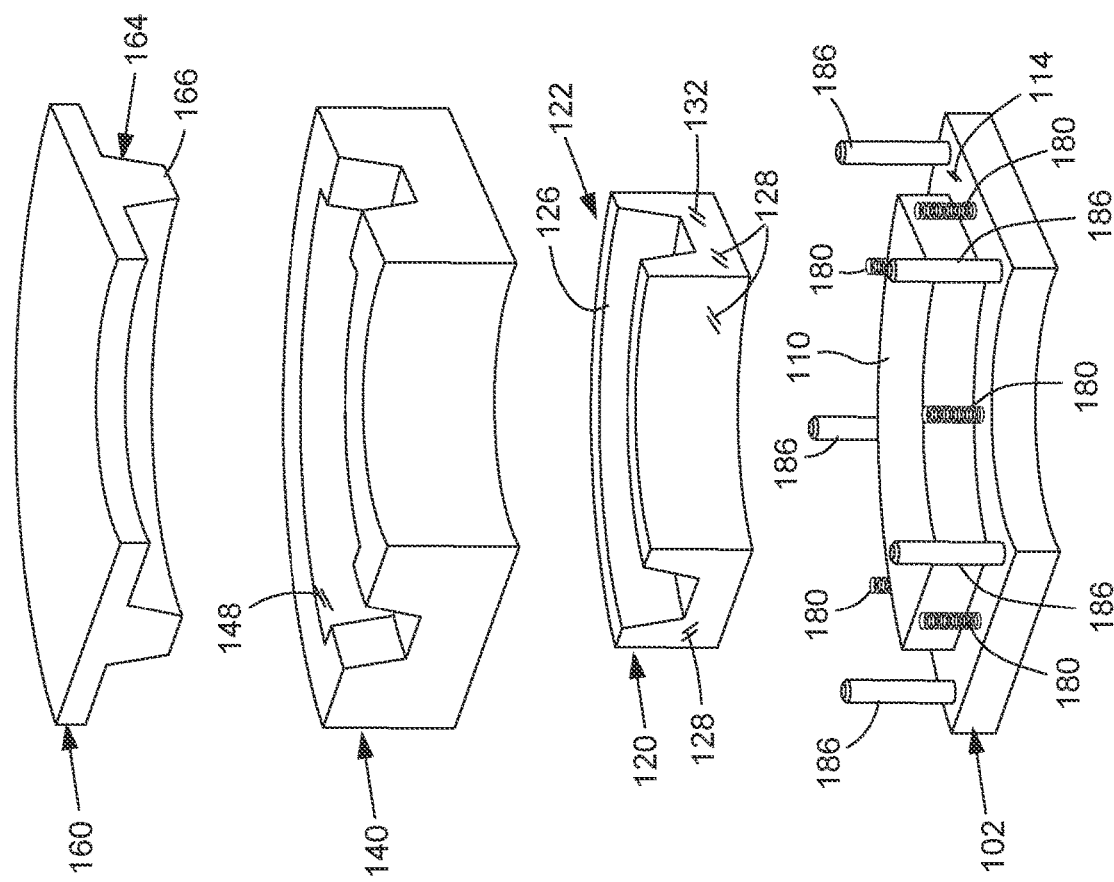
FIG. 13 is an exploded view of the stamp-forming system of FIG. 11.
Figure 14:
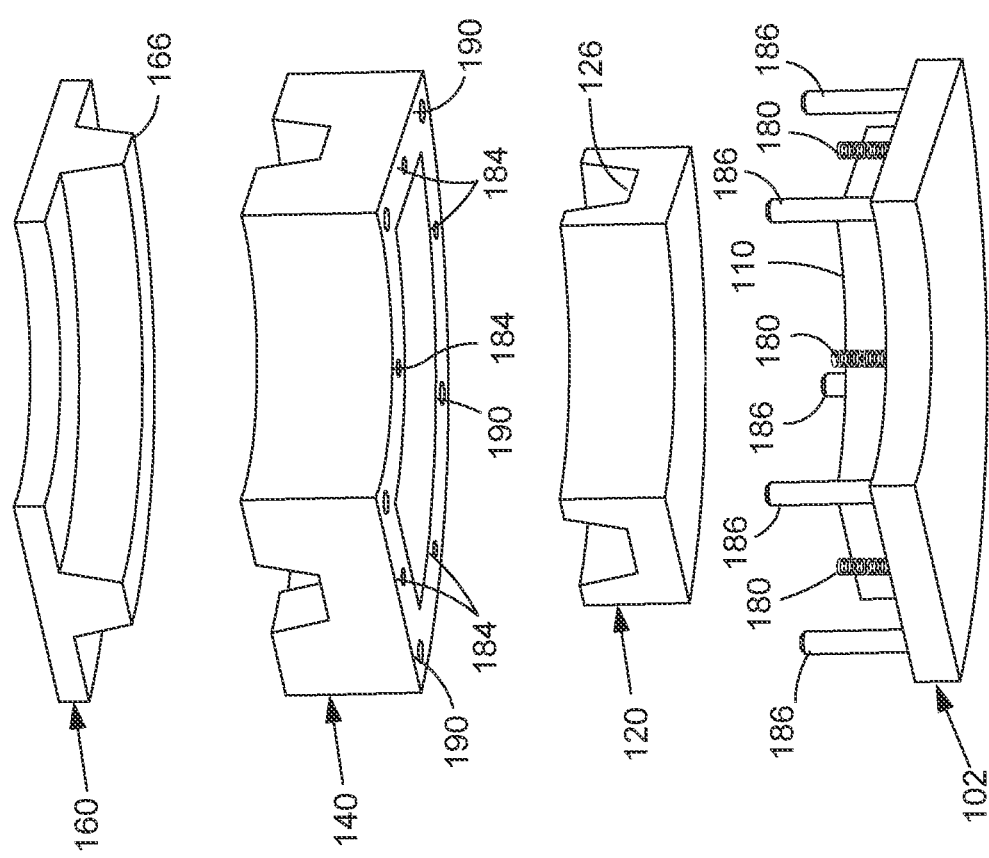
FIG. 14 is a further exploded view of the stamp-forming system of FIG. 11.
Figure 15:
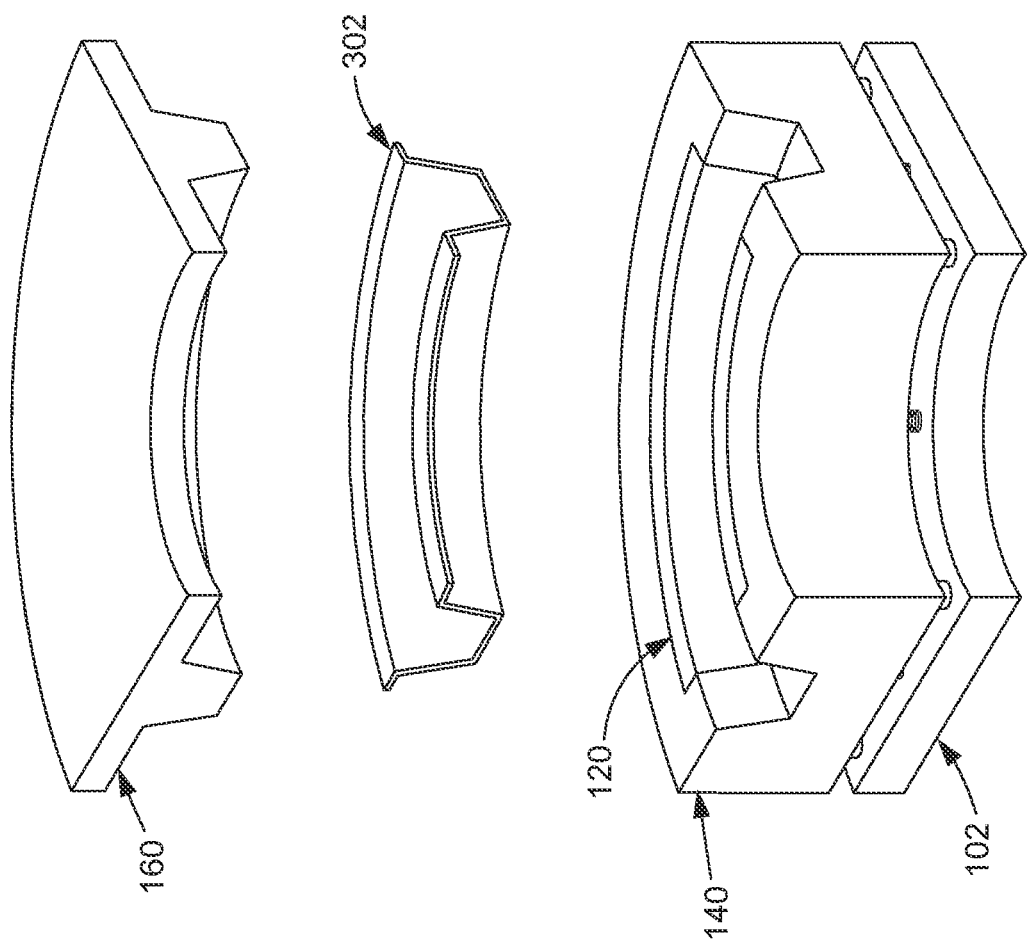
FIG. 15 is a perspective view of the stamp-forming system of FIG. 11, and showing a formed part resulting from forming a thermoplastic blank.

As shown in FIGS. 2-4, the coil springs 182 are mounted to the ledge 114 of the base member 102. The die wall bottom side 144 includes a set of spring bores 184 for receiving the coil springs 182. In the example of FIG. 7, the stamp-forming system 100 includes a coil spring between each pair of alignment pins 188. However, any number of coil springs 182 can be provided, and the coil springs 182 may be positioned at any one of a variety of locations along the ledge 114 of the base member 102.

Although shown as coil springs 182, the resiliently compressible devices 180 may be provided in any one of a variety of alternative configurations. For example, the resiliently compressible devices 180 may be provided as one or more strips of resiliently compressible high-temperature material (not shown) mounted to the ledge 114 and/or mounted to the die wall bottom side 144. Such resiliently compressible high-temperature material can be provided in a thickness that supports the die wall 140 at the height shown in FIG. 8, while allowing free vertical movement of the die wall 140 relative to the lower die 120 when the upper die 160 moves from the open position 168 to the clamped position 170, as shown in FIGS. 8-10. Regardless of their configuration, the resiliently compressible devices 180 are configured to compress without hindering the upper die 160 from applying the desired amount of clamping pressure 210 (FIG. 10) to the blank 300.

Referring to FIGS. 2-4 and 7, the alignment devices 186 comprise a plurality of alignment pins 188 protruding upwardly from the ledge 114 of the base member 102 and/or protruding downwardly (not shown) from the die wall bottom side 144. A corresponding plurality of pin bores 190 can be formed in the base member 102 or the die wall bottom side 144. The pin bores 190 are sized complementary to the alignment pins 188, and are configured to receive the alignment pins 188. Although shown as cylindrically-shaped, the alignment pins 188 and pin bores 190 can be provided in any cross-sectional shape. Although FIG. 7 shows an alignment pin 188 at each corner of the base member 102, the alignment pins 188 may be provided at any location, including at the mid-points between the corners of the base member 102. As mentioned above, the alignment devices 186 (e.g., alignment pins 188) are configured to maintain the die wall 140 in alignment with the lower die 120 during vertical movement of the die wall 140. In this regard, the alignment devices 186 are configured to prevent lateral movement of the die wall 140 during its vertical movement, and thereby prevent contact between the die wall 140 and the lower die 120, which may otherwise hinder the movement of the die wall 140.

Referring to FIGS. 11-15, shown is another example of a stamp-forming system 100, which has the same basic components as the stamp-forming system 100 of FIGS. 1-10, including an upper die 160, a lower die 120, a die wall 140, and a base member 102. In addition, the stamp-forming system 100 of FIGS. 11-15 includes one or more resiliently compressible devices 180, and one or more alignment devices 186. In this regard, any one or more of the above-described configurations, characteristics, materials, and/or functionalities of any one or more of the components of the stamp-forming system 100 of FIGS. 1-10 are applicable to the stamp-forming system 100 of FIGS. 11-15.

In FIGS. 11-15, the upper die 160 is formed of rigid material (e.g., tool steel), and has an upper die bottom side 164 having an upper die contour 166 or cross-sectional shape that extends between opposing ends of the upper die bottom side 164. As shown, the upper die contour 166 is curved in the horizontal plane. The lower die 120 is formed of elastomeric material (e.g., RTV rubber), and has lower die lateral sides 128 and a lower die top side 122 having a lower die contour 126 that matches the upper die contour 166. Similar to the upper die contour 166, the lower die contour 126 extends between opposing ends of the lower die top side 122.

The die wall 140 is formed of a rigid material (e.g., tool steel), and is configured to encircle the lower die lateral sides 128, and move vertically relative to the lower die 120. The die wall 140 has opposing ends that are shaped complementary to the upper die contour 166 and the lower die contour 126. As mentioned above, the upper die 160 is configured to move between an open position 168 (FIG. 11) in which the upper die 160 is separated from the die wall 140 and the lower die 120, and a clamped position 170 (FIG. 12) in which the upper die 160 is in contact with the die wall 140, and applies clamping pressure 210 (FIG. 10) to the blank 300 against the lower die 120, to thereby form the blank 300 into a formed article 302. The die wall 140 is sized and configured to prevent lateral expansion of the elastomeric material of the lower die 120 when the lower die 120 is vertically compressed by the clamping pressure 210 of the upper die 160. More specifically, at all points along the die wall inner perimeter 148, the die wall height 146 corresponds to variations in the lower die height 130. In this regard, the die wall height 146 is at least as tall as the lower die height 130, such that when the upper die 160 applies clamping pressure 210 to the blank 300 against the lower die 120, the die wall 140 fully contains the lower die 120 against lateral expansion, thereby preventing stress concentrations along the lower die outer perimeter 132 that could result in damage to the lower die 120.

Figure 16:
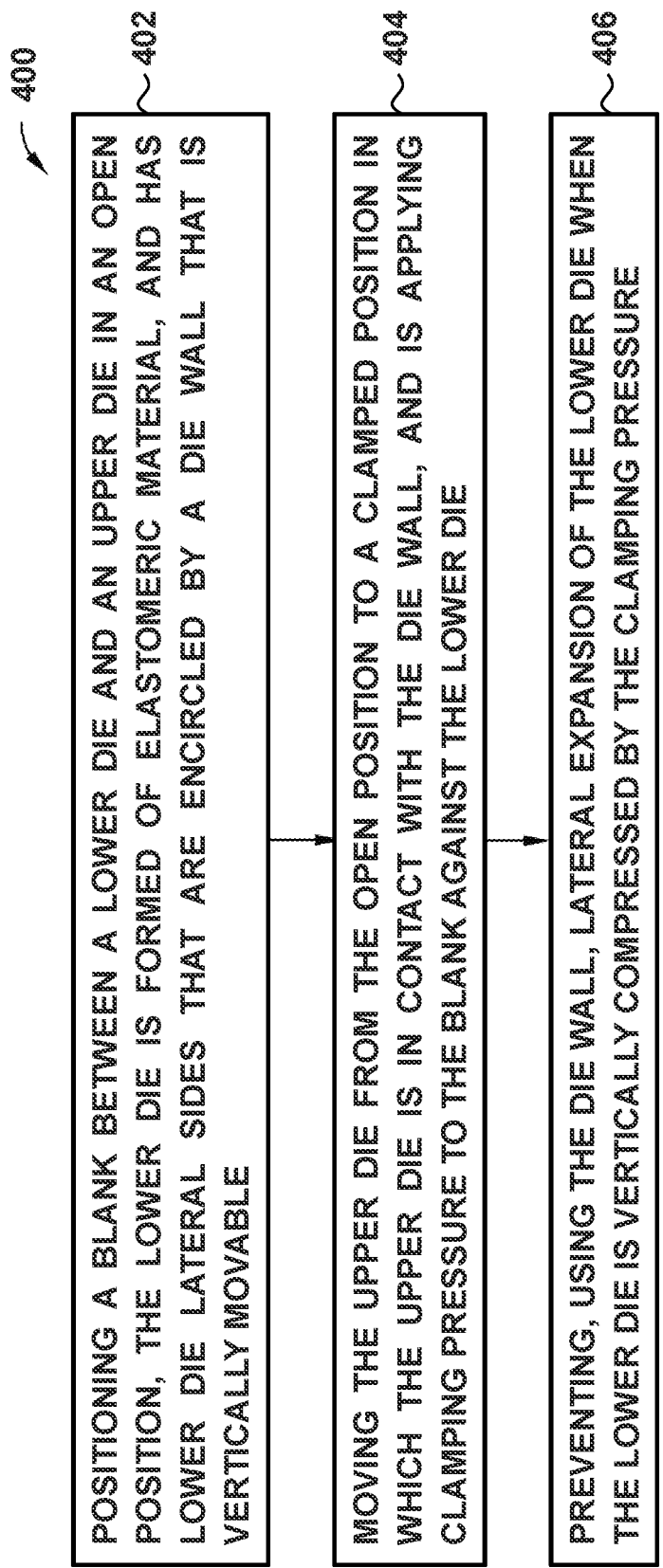
FIG. 16 is a flowchart of operations included in a method of stamp forming a blank using the presently-disclosed stamp-forming system.

Referring now to FIGS. 16-23, shown in FIG. 16 is a flowchart of operations included in a method 400 of stamp forming a blank 300 into a formed article 302. The method 400 includes preheating a stamp-forming system 100, such as the above-described example shown in FIGS. 1-10. For scenarios where the blank 300 is a thermoplastic laminate, the stamp-forming system 100 may be heated to a temperature between the melting temperature and the glass transition temperature of the thermoplastic resin in the thermoplastic laminate. The stamp-forming system 100 may be heated via convection, conduction, and/or other methods. Due to its relatively large thermal mass, several hours may be required to heat the stamp-forming system 100 to the desired temperature.

As mentioned above, the stamp-forming system 100 may be heated after the stamp-forming system 100 is installed within a forming press 204, which has a movable upper press 206 and a stationary press bed 208. As shown in FIG. 18, the upper die 160 is coupled to the upper press 206, and the base member 102 is mounted on the press bed 208. The method 400 includes supporting the lower die 120 on the platform 110 (FIG. 2) of the base member 102. As described above, the platform 110 has a platform outer perimeter 112 (FIG. 2) that is no larger than the lower die outer perimeter 132 (FIG. 2).

The method 400 includes supporting the die wall 140 using one or more resiliently compressible devices 180. In the example shown, the method 400 includes supporting the die wall 140 using coil springs 182 mountable to the die wall 140 or the ledge 114, as shown in FIGS. 2-4. As mentioned above, the die wall 140 is supported in a manner such that the die wall top side 142 is located above the lower die top side 122 when the upper die 160 is in the open position 168, as shown in FIG. 8. The method 400 additionally includes urging, using the resiliently compressible devices 180, the die wall 140 against the upper die 160 when the upper die 160 is moving into the clamped position 170, as shown in FIGS. 9-10.

The method further includes maintaining, using one or more alignment devices 186, the die wall 140 in alignment with the lower die 120 during movement of the die wall 140. As mentioned above, the die wall 140 is maintained in alignment with the lower die 120 using a plurality of alignment pins 188 protruding from the base member 102, and which are receivable within a corresponding plurality of pin bores 190 formed in the die wall 140.

The method 400 can include supporting the blank 300 (e.g., thermoplastic laminate) using a blank holding frame. Although not shown, the blank holding frame can include tensioning clips (e.g., tension springs) coupled to the perimeter edges of the blank 300, for applying tension to the blank 300 to prevent excessive sagging of the blank 300 when the blank 300 is heated. The method 400 can additionally include transferring the blank 300 into an oven 200, such as by using the blank holding frame. For examples where the blank 300 is a thermoplastic laminate, the oven 200 can be an infrared oven that is preferably located near the forming press 204.

The method 400 includes applying heat 202 to the blank 300, to thereby heat the blank 300 up to the temperature at which the blank 300 is formable. For a thermoplastic laminate, the method includes heating the thermoplastic laminate up to the approximate melting temperature of the thermoplastic resin. Although not shown, one or more thermocouples may be embedded within the plies of the thermoplastic laminate to provide a means for monitoring the temperature of the thermoplastic laminate during heating. Heating the blank 300 up to its forming temperature can take several minutes or more, depending upon the thickness of the blank 300. For example, an infrared oven may require 1 to 2 minutes to heat a thermoplastic laminate up to the approximate melting point of the thermoplastic resin.

After the blank 300 is heated up to its forming temperature, the method 400 includes transferring the blank 300 from the oven 200 to the forming press 204. The blank 300 can be transferred using the same blank holding frame (not shown) that is used to support the blank 300 in the oven 200. Preferably, the oven 200 is located near the forming press 204 to minimize heat loss from the blank 300 prior to the forming process.

Figure 19:
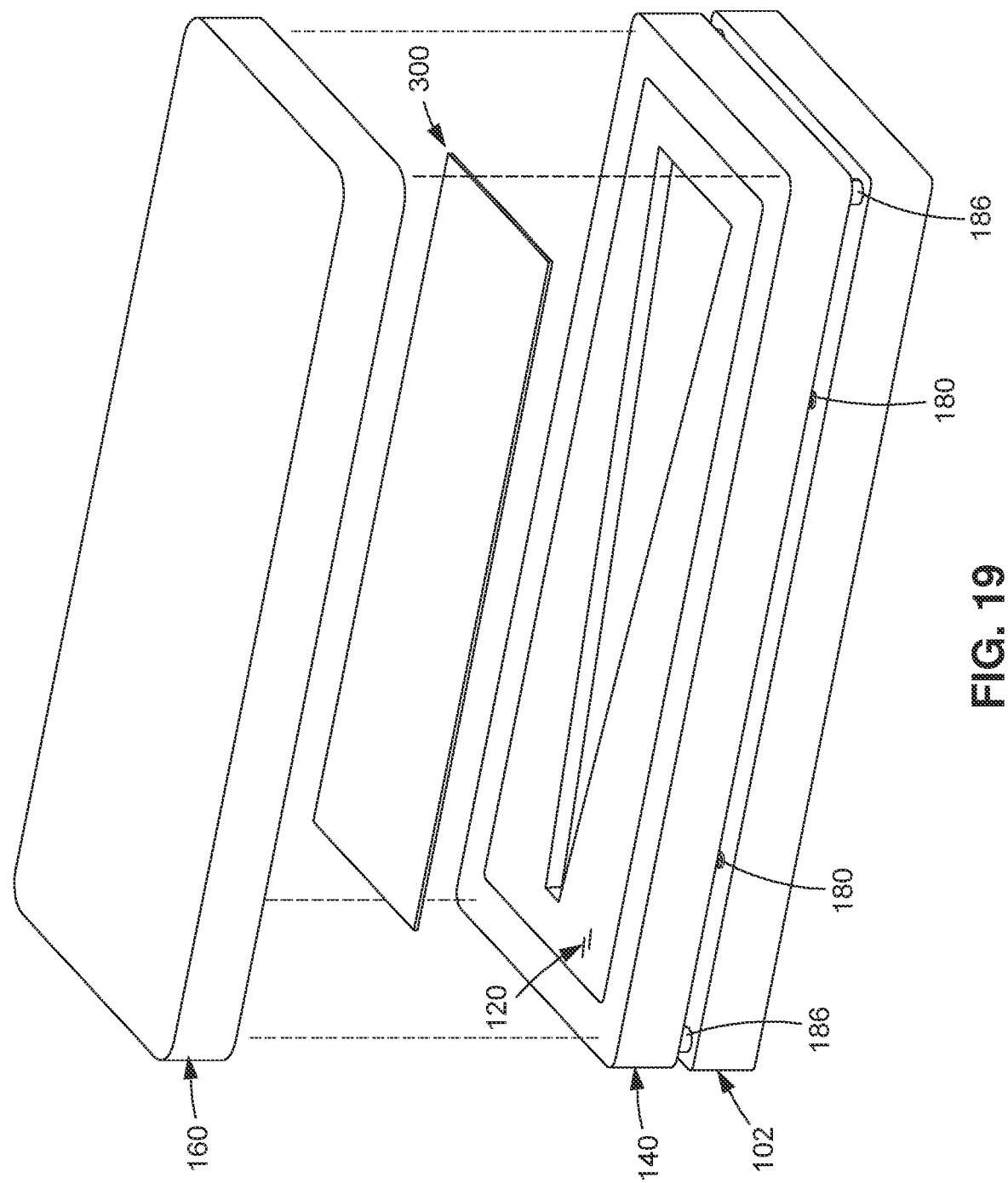
FIG. 19 is a perspective view of the stamp-forming system showing the upper die in the open position, and a thermoplastic blank positioned between the upper die and the lower die.
Figure 20:
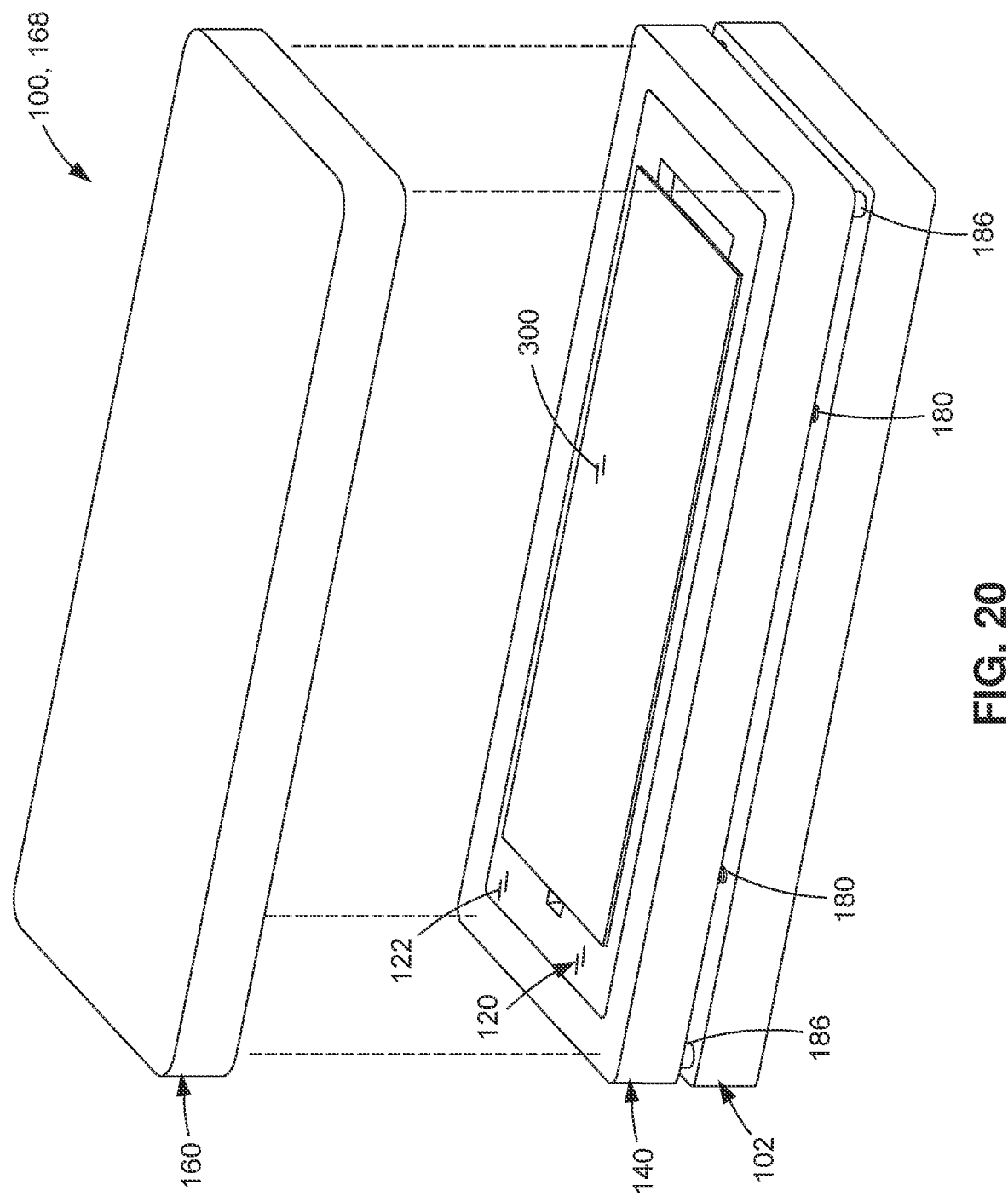
FIG. 20 shows the stamp-forming system of FIG. 19, and illustrating the thermoplastic blank positioned on top of the lower die.
Figure 21:
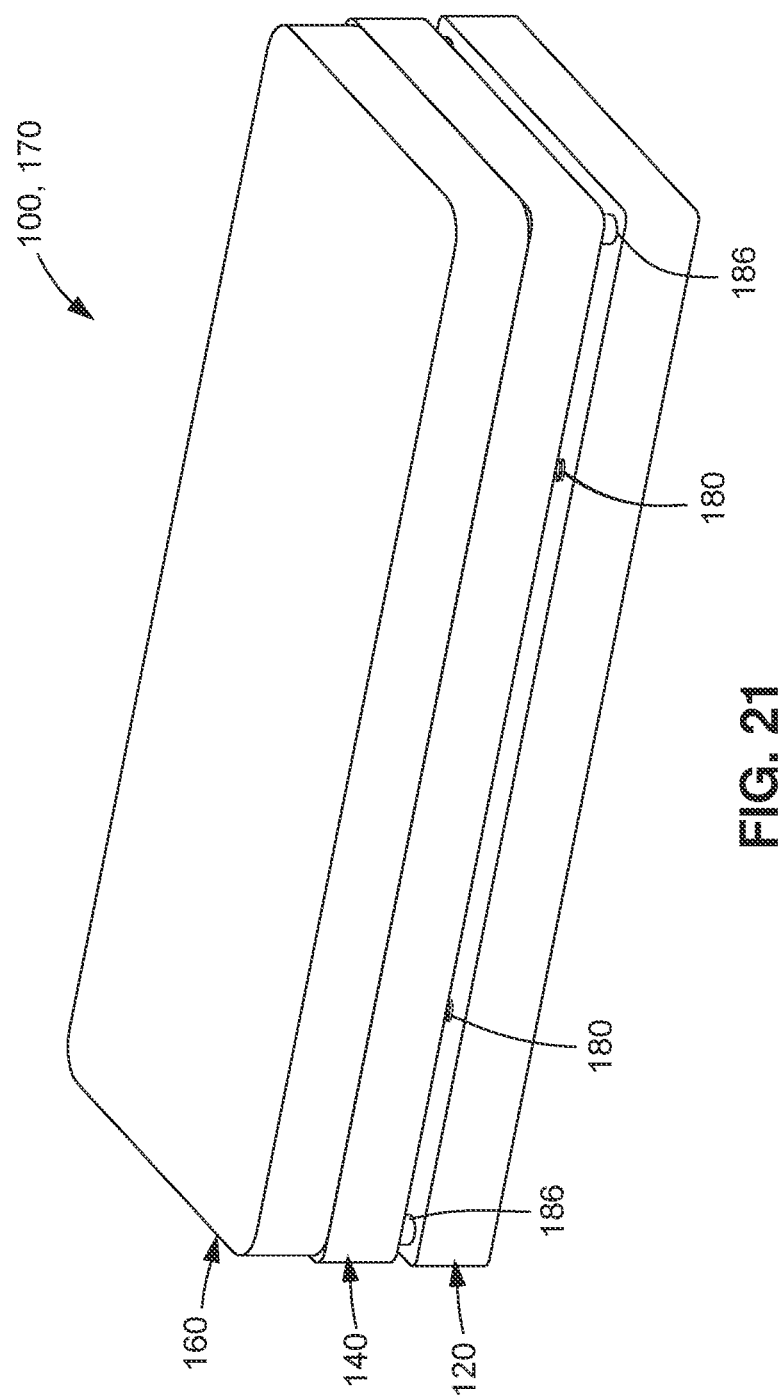
FIG. 21 shows the stamp-forming system of FIG. 19 in the closed position.

Referring to FIGS. 18-19, step 402 of the method 400 includes positioning the blank 300 between the lower die 120 and the upper die 160 when in the open position 168. In the presently-disclosed example, positioning the blank 300 between the lower die 120 and the upper die 160 comprises positioning a heated thermoplastic laminate between the lower die 120 and the upper die 160, as shown in FIG. 19. In some examples, the method 400 includes vertically lowering the blank 300 into contact with the lower die top side 122 prior to moving the upper die 160 from the open position 168 (FIG. 20) toward the clamped position 170 (FIG. 21). As described above, the lower die 120 is formed of elastomeric material, and has lower die lateral sides 128 that are encircled by the die wall 140, which is vertically movable.

Step 404 of the method 400 includes moving the upper die 160 from the open position 168 (FIG. 8) to the clamped position 170 in which the upper die 160 is in contact with the die wall 140 (FIG. 9). In this regard, step 404 includes lowering the upper die 160 into contact with the die wall 140 while supporting the blank 300 using the blank holding frame (not shown). In some examples not shown, the lateral dimensions of the blank 300 may be larger than the lateral dimensions of the die wall 140, to allow the blank 300 to be supported by a blank holding frame. In such case, the blank 300 may be clamped between the upper die 160 and the die wall 140 when the upper die 160 is in the clamped position 170.

The resiliently compressible devices 180 (e.g., coil springs 182) urge the die wall 140 toward the upper die bottom side 164. In this regard, the resiliently compressible devices 180 maintain the die wall 140 in contact with the upper die bottom side 164 while the upper die 160 moves into the clamped position 170. Movement of the upper die 160 into the clamped position 170 causes the blank 300 to assume the shape of the upper die contour 166 and the lower die contour 126. During the initial stages of forming a thermoplastic laminate, the low viscosity of the thermoplastic resin (i.e., near its melting temperature) allows the plies to slip relative to each other as necessary to allow the thermoplastic laminate to conform to the shape of the upper die contour 166 and lower die contour 126.

The method 400 includes holding the blank 300 in the clamped position 170 (e.g., FIGS. 10 and 21) while the upper die 160 applies the desired amount of clamping pressure 210 to the blank 300 for a predetermined dwell period. During the dwell period, the thermoplastic resin flows through the fibers in the plies of the thermoplastic laminate, and intermingles with the thermoplastic resin in adjacent plies, which allows the plies to bond together. The clamping pressure 210 may be applied until the blank 300 cools below its glass transition temperature.

Step 406 of the method 400 includes preventing, using the die wall 140, lateral expansion of the lower die 120 when the lower die 120 is vertically compressed by the clamping pressure 210 (FIG. 10). As mentioned above, the resiliently compressible devices 180 prevent gaps between the upper die 160 and the die wall 140. In addition, the die wall height 146 is greater than the lower die height 130, such that when the upper die 160 starts to apply the clamping pressure 210 to the blank 300 against the lower die 120, the die wall bottom side 144 is no higher than the lower die bottom side 124, and is preferably lower than the lower die bottom side 124, such that the lower die 120 is fully surrounded by the upper die 160, the lower die 120, and the die wall 140, as shown in FIG. 10.

Figure 22:
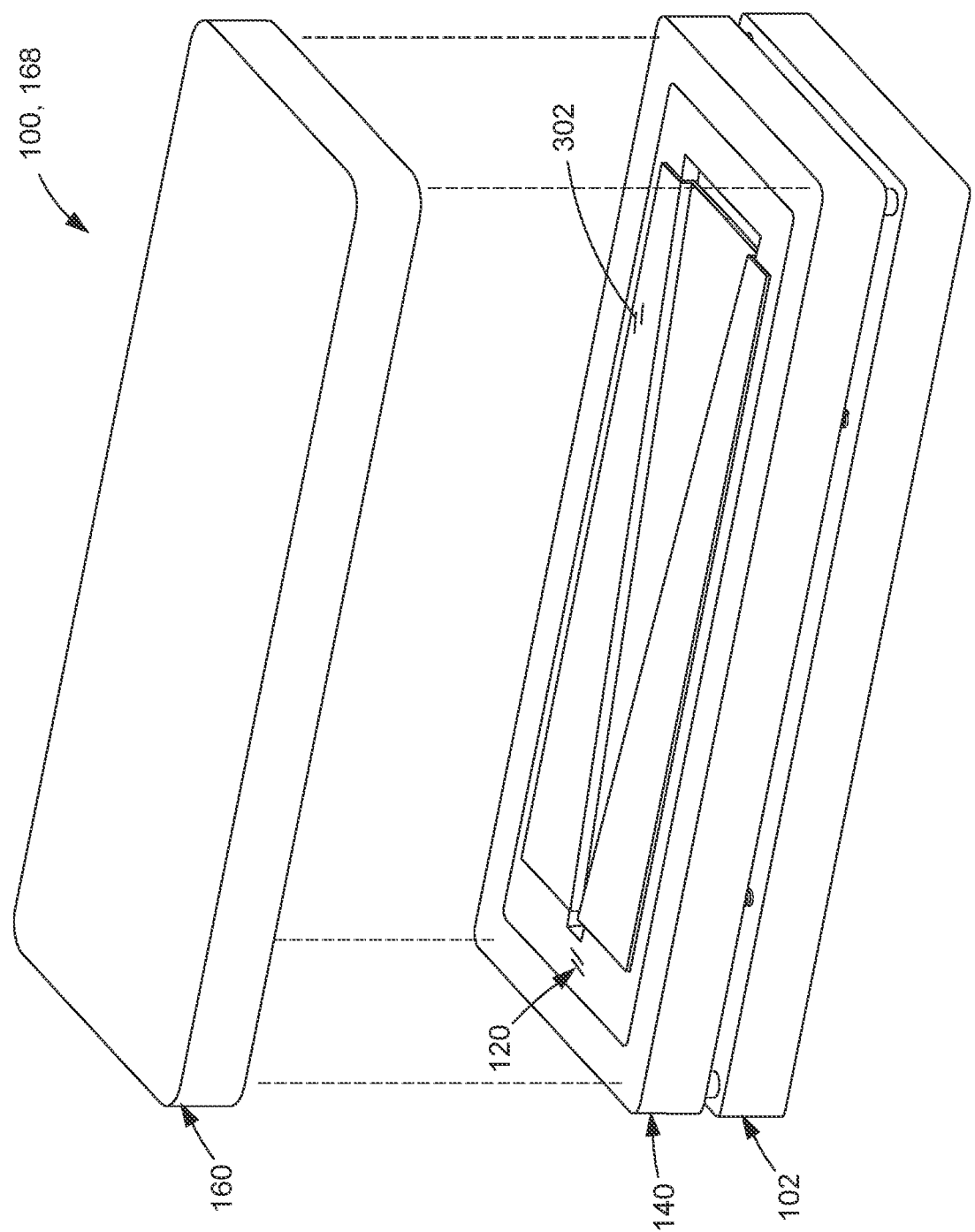
FIG. 22 shows the stamp-form system of FIG. 19 in the open position after forming the thermoplastic blank into a formed part.

At the completion of the dwell period, the method 400 includes raising the upper die 160 back to the open position 168 as shown in FIG. 22. The formed article 302 (FIG. 23) can then be removed from the stamp-forming system 100. Advantageously, by fully containing the elastomeric lower die 120 against lateral expansion when forming the blank 300, the quality of the formed article 302 is improved. In addition, by preventing expansion of the lower die 120 in the lateral direction 212, the lifespan of the lower die 120 is increased.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A stamp-forming system for forming a blank into a formed article, comprising:
    a lower die formed of elastomeric material and having lower die lateral sides that define a lower die outer perimeter;
    a die wall having a die wall top side and a die wall inner perimeter that has a constant cross-sectional shape that is open on the die wall top side and which is no smaller than the lower die outer perimeter, and configured to encircle the lower die lateral sides, and move vertically relative to the lower die;
    an upper die configured to move between an open position in which the upper die is separated from the die wall and the lower die, and a clamped position in which the upper die is in direct contact with the die wall and applying clamping pressure to a blank against the lower die, to thereby form the blank into a formed article; and
    wherein the die wall is sized and configured to prevent lateral expansion of the lower die when the lower die is vertically compressed by the clamping pressure applied by the upper die.

2. The stamp-forming system of claim 1, wherein:
    the elastomeric material of the lower die is one of the following: natural rubber, synthetic rubber, RTV rubber, silicone, or combinations thereof.

3. The stamp-forming system of claim 1, wherein the die wall has a die wall top side, and the lower die has a lower die top side, the stamp-forming system further comprising:
    one or more resiliently compressible devices configured to:
        support the die wall in a manner such that the die wall top side is located above the lower die top side when the upper die is in the open position; and
        urge the die wall against the upper die when the upper die is moving into the clamped position.

4. The stamp-forming system of claim 1, further comprising:
    one or more alignment devices configured to maintain the die wall in alignment with the lower die during movement of the die wall.

5. The stamp-forming system of claim 1, wherein:
    the lower die has a lower die outer perimeter;
    the die wall has a die wall inner perimeter; and
    the lower die and the die wall are sized and configured such that, prior to the upper die applying the clamping pressure to the blank against the lower die, there is a maximum gap of 0.10 inch at any location between the lower die outer perimeter and the die wall inner perimeter.

6. The stamp-forming system of claim 3, wherein:
    the one or more resiliently compressible devices comprise a plurality of coil springs.

7. The stamp-forming system of claim 3, further comprising:
    a base member configured to support the lower die, and having a ledge encircling base member lateral sides of the base member; and
    wherein each of the one or more the resiliently compressible devices is mountable to one of the die wall or the ledge.

8. The stamp-forming system of claim 7, wherein:
    the die wall has a die wall bottom side;
    the lower die has a lower die bottom side, and a lower die outer perimeter defined by the lower die lateral sides;
    the base member has a platform protruding above the ledge; and
    the platform is configured to support the lower die bottom side, and has a platform outer perimeter that is no larger than the lower die outer perimeter, thereby allowing the die wall bottom side to move below the lower die bottom side during vertical movement of the die wall.

9. The stamp-forming system of claim 4, further comprising:
    a base member configured to support the lower die;
    wherein the one or more alignment devices comprise:
        a plurality of alignment pins, each protruding from one of the base member and the die wall; and
        a corresponding plurality of pin bores configured to receive the plurality of alignment pins, each of the pin bores is formed in one of the base member and the die wall.

10. A stamp-forming system for forming a blank, comprising:

an upper die formed of rigid material and having an upper die bottom side having an upper die contour;

a lower die formed of elastomeric material and having lower die lateral sides that define a lower die outer perimeter and a lower die top side having a lower die contour that matches the upper die contour;

a die wall having a die wall top side and a die wall inner perimeter that has a constant cross-sectional shape that is open on the die wall top side and which is no smaller than the lower die outer perimeter, and configured to encircle the lower die lateral sides, and move vertically relative to the lower die;

wherein:

the upper die is configured to move between an open position in which the upper die is separated from the die wall and the lower die, and a clamped position in which the upper die is in direct contact with the die wall and applying clamping pressure to a blank against the lower die, to thereby form the blank into a formed article; and the die wall is sized and configured to prevent lateral expansion of the elastomeric material of the lower die when the lower die is vertically compressed by the clamping pressure of the upper die.

11. The stamp-forming system of claim 10, wherein:

the upper die contour extends between opposing ends of the upper die bottom side; and the lower die contour extends between opposing ends of the lower die top side.

12. The stamp-forming system of claim 10, wherein:

the die wall has opposing ends that are shaped complementary to the upper die contour and the lower die contour.

13. A method of stamp forming a blank into a formed article, comprising:

positioning a blank between a lower die and an upper die in an open position, the lower die is formed of elastomeric material, and has lower die lateral sides that define a lower die outer perimeter and that are encircled by a die wall that is vertically movable relative to the lower die and which has a die wall top side and a die wall inner perimeter having a constant cross-sectional shape that is open on the die wall top side and which is no smaller than the lower die outer perimeter;

moving the upper die from the open position in which the upper die is separated from the die wall and the lower die, to a clamped position in which the upper die is in direct contact with the die wall, and is applying clamping pressure to the blank against the lower die, to thereby form the blank into a formed article; and preventing, using the die wall, lateral expansion of the lower die when the lower die is vertically compressed by the clamping pressure applied by the upper die.

14. The method of claim 13, further comprising:

supporting, using one or more resiliently compressible devices, the die wall in a manner such that a die wall top side is located above a lower die top side when the upper die is in the open position; and urging, using the one or more resiliently compressible devices, the die wall against the upper die when the upper die is moving into the clamped position.

15. The method of claim 13, further comprising:

maintaining, using one or more alignment devices, the die wall in alignment with the lower die during movement of the die wall.

16. The method of claim 13, wherein positioning the blank between the lower die and the upper die comprises:

positioning a heated thermoplastic laminate between the lower die and the upper die.

17. The method of claim 14, wherein the die wall has a die wall bottom side, and the lower die is supported on a base member having base member lateral sides, and a ledge encircling the base member lateral sides, the step of supporting the die wall comprising:

supporting the die wall using one or more resiliently compressible devices, each mountable to one of the die wall or the ledge.

18. The method of claim 17, wherein the step of supporting the die wall comprises:

supporting the die wall using a plurality of coil springs.

19. The method of claim 17, further comprising:

supporting the lower die on a platform of the base member, the platform having a platform outer perimeter that is no larger than a lower die outer perimeter; and moving the die wall bottom side below a lower die bottom side during vertical movement of the die wall.

20. The method of claim 15, wherein the lower die is supported on a base member, the step of maintaining the die wall in alignment with the lower die comprising:

maintaining the die wall in alignment with the lower die using a plurality of alignment pins protruding from at least one of the base member and the die wall, and receivable within a corresponding plurality of pin bores formed in at least one of the base member and the die wall.

* * * * *